(12) United States Patent
Cook

(10) Patent No.: US 6,933,046 B1
(45) Date of Patent: Aug. 23, 2005

(54) RELEASABLE CORROSION INHIBITOR COMPOSITIONS

(75) Inventor: Ronald Lee Cook, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 10/412,737

(22) Filed: Apr. 11, 2003

Related U.S. Application Data

(63) Continuation-in-part of application No. 10/171,402, filed on Jun. 12, 2002, and a continuation-in-part of application No. 10/171,422, filed on Jun. 12, 2002.

(51) Int. Cl.[7] .............................................. B32B 5/16
(52) U.S. Cl. ..................... 428/402; 428/403; 428/404; 428/405; 428/407; 428/457; 556/179
(58) Field of Search ................................ 428/402, 403, 428/404, 405, 407; 556/179

(56) References Cited

U.S. PATENT DOCUMENTS

| | | | |
|---|---|---|---|
| 3,117,944 | A | 1/1964 | Harrell |
| 3,268,295 | A | 8/1966 | Armbrust, Jr. et al. |
| 3,411,876 | A | 11/1968 | Michel et al. |

(Continued)

FOREIGN PATENT DOCUMENTS

| | | |
|---|---|---|
| DE | 3122907 A | 1/1983 |
| EP | 0385880 A2 | 3/1990 |
| EP | 0236497 B | 7/1991 |

(Continued)

OTHER PUBLICATIONS

K. Andrianov et al., *Synthesis of New Polymers with Inorganic Chains of Molecules,* Journal of Polymer Science, vol. XXX, pp. 513–524, 1958.

A. Apblett et al., *Systhesis and Characterization of Triethylsiloxy–Substituted Alumoxanes: Their Structural Relationship to the Minerals Boehmite and Diaspore,* Chemistry of Materials 4(1):167–182, 1992.

(Continued)

*Primary Examiner*—Leszek B. Kiliman
(74) *Attorney, Agent, or Firm*—Greenlee, Winner and Sullivan, P.C.

(57) ABSTRACT

A new class of releasable corrosion inhibiting materials for protective coatings, methods of making the same, methods of using the same, and coatings containing the same are provided. The materials comprise one or more corrosion inhibitors that are chemically anchored to the surface of a particle having an aluminum oxyhydroxide surface through a carboxylate bond. The carboxylate/aluminum-oxyhydroxide-surface bond breaks under corrosion-causing conditions (for example the presence of high levels of hydroxide ions generated by the cathodic oxygen reduction reaction on metals such as iron and aluminum) thereby allowing the corrosion inhibitors to detach from the particle surface when corrosion is present.

44 Claims, 3 Drawing Sheets

U.S. PATENT DOCUMENTS

| | | | |
|---|---|---|---|
| 3,411,877 A | | 11/1968 | Michel et al. |
| 3,515,689 A | * | 6/1970 | Brane et al. ............... 106/262 |
| 3,899,624 A | | 8/1975 | Sutherland |
| 3,901,845 A | | 8/1975 | Newbould |
| 3,997,476 A | | 12/1976 | Cull |
| 4,010,247 A | | 3/1977 | Wassermann et al. |
| 4,091,164 A | | 5/1978 | Schwarz |
| 4,169,014 A | | 9/1979 | Goldberg |
| 4,210,575 A | | 7/1980 | Drake |
| 4,211,667 A | | 7/1980 | Yamada et al. |
| 4,327,032 A | | 4/1982 | Lohse et al. |
| 4,346,184 A | | 8/1982 | Drake |
| 4,349,389 A | | 9/1982 | Schofield |
| 4,405,493 A | | 9/1983 | Pippard |
| 4,419,137 A | | 12/1983 | Cayless et al. |
| 4,420,341 A | | 12/1983 | Ferrigno |
| 4,428,774 A | | 1/1984 | Drake et al. |
| 4,459,155 A | | 7/1984 | Cayless |
| 4,474,607 A | | 10/1984 | Goldie et al. |
| 4,496,714 A | | 1/1985 | Murata et al. |
| 4,518,429 A | | 5/1985 | Drake et al. |
| 4,532,072 A | | 7/1985 | Segal |
| 4,561,896 A | | 12/1985 | Drake et al. |
| 4,594,369 A | | 6/1986 | Othen |
| 4,643,769 A | | 2/1987 | Othen |
| 4,676,928 A | | 6/1987 | Leach et al. |
| 4,687,595 A | | 8/1987 | Howes et al. |
| 4,738,720 A | | 4/1988 | Eckler et al. |
| 4,749,550 A | | 6/1988 | Goldie et al. |
| 4,764,495 A | | 8/1988 | Rice |
| 4,795,492 A | | 1/1989 | Othen |
| 4,897,439 A | | 1/1990 | Rau et al. |
| 4,900,767 A | | 2/1990 | Rice |
| 4,929,589 A | | 5/1990 | Martin et al. |
| 4,952,634 A | | 8/1990 | Grossman |
| H856 H | | 12/1990 | Kutik et al. |
| 4,992,199 A | | 2/1991 | Meyer et al. |
| 5,041,241 A | | 8/1991 | Fletcher |
| 5,093,403 A | | 3/1992 | Rau et al. |
| 5,141,656 A | | 8/1992 | Rountree |
| 5,212,261 A | | 5/1993 | Stierman |
| 5,352,342 A | | 10/1994 | Riffe |
| 5,418,298 A | | 5/1995 | Laine et al. |
| 5,426,916 A | | 6/1995 | Grigsby et al. |
| 5,478,451 A | | 12/1995 | Riffe |
| 5,489,447 A | | 2/1996 | Kramer et al. |
| 5,536,583 A | | 7/1996 | Roberts et al. |
| 5,576,468 A | | 11/1996 | Lubowitz |
| 5,593,654 A | | 1/1997 | Decker, Jr. et al. |
| 5,593,781 A | * | 1/1997 | Nass et al. ............... 428/403 |
| 5,814,407 A | | 9/1998 | Richard et al. |
| 6,068,879 A | | 5/2000 | Pasch |
| 6,106,901 A | | 8/2000 | Song et al. |
| 6,132,808 A | | 10/2000 | Brown et al. |
| 6,207,130 B1 | | 3/2001 | Kareiva et al. |
| 6,224,846 B1 | | 5/2001 | Hurlburt et al. |
| 6,228,903 B1 | | 5/2001 | Beall et al. |
| 6,322,890 B1 | * | 11/2001 | Barron et al. ............... 428/402 |
| 6,361,592 B1 | | 3/2002 | Song et al. |
| 6,369,183 B1 | | 4/2002 | Cook et al. |
| 6,383,271 B1 | | 5/2002 | Schmidt |
| 6,383,414 B1 | | 5/2002 | Pasch |
| 6,602,933 B2 | | 8/2003 | Tang et al. |

FOREIGN PATENT DOCUMENTS

| | | |
|---|---|---|
| EP | 0576695 A | 1/1994 |
| EP | 0252669 B1 | 4/1994 |
| EP | 0366727 B | 10/1996 |
| EP | 0985737 A | 3/2000 |
| EP | 0995816 A | 4/2000 |
| EP | 0690933 B | 8/2001 |
| EP | 0252669 B2 | 11/2001 |
| GB | 2039913 A | 8/1980 |
| WO | 87/01622 | 3/1987 |
| WO | 91/19607 | 12/1991 |
| WO | 93/21197 A | 10/1993 |
| WO | 94/21843 | 9/1994 |
| WO | 96/26240 A | 8/1996 |
| WO | 97/23288 | 7/1997 |
| WO | 98/35917 | 9/1998 |
| WO | 99/50203 A | 10/1999 |
| WO | 00/09578 | 2/2000 |

OTHER PUBLICATIONS

A. Apblett et al., *From Mineals to Materials: A Facile Synthetic Route to Preceramic Polymers for Aluminum Oxide*, Materials Research Society Symposium Proceedings, vol. 249, pp 75–80, 1992.

R.S. Bauer, *Epoxy Resins*, ACS Symp. Ser. 285, Applied Polymer Science, II Edition, Roy W. Tess and G. W. Poehlein, Editors, ACS, Washington, pp. 931–961, 1985.

R. Callender et al., *Aqueous Synthesis of Water–Soluble Alumoxanes: Environmentally Benign Precursors to Alumina and Aluminum–Based Ceramics*, Chemistry of Materials 9(11):2418–2433, 1997.

S. Cohen, *Replacements for Chromium Pretreatments on Aluminum*, Corrosion 51(1):71–78, 1995.

J.M.G. Cowie, *Polymers: Chemistry and Physics of Modern Material*, Intertext Books, Aylesbury, pp 1–23, 1973.

J.H.W. deWit et al., *Evaluation of Coatings—A Total System Approach*, Materials Science Forum, vol. 247, pp 69–82, 1997.

B. Ellis, *Chemistry and Technology of Epoxy Resins*, Blackie Academic & Professional, Chapters 1,2,4 & 7, pp 1–71, 117–143, 206–255, 1993.

G. Frankel et al., *Inhibition of Al Alloy Corrosion by Chromates*, Electrochemical Society Interface 10(4):34–38, 2001.

A. Gusev et al., *Rational Design of Nanocomposites for Barrier Applications*, Advanced Materials 13(21):1641–163, Nov. 2001.

J. Hauck, *Thermal Conductivity of Epoxy Resin–Aluminium (0 to 50%) Composites*, Journal of Materials Science 12 Letters, pp. 1689–1691, 1977.

C. Jones et al., *Carhboxylate–Alumoxanes: Environmentally Benign Precursors for Developing Aluminum Based Ceramic Membranes and Filters*, 9th CIMTEC, Word Ceramic Congress, pp 413–420, 1986.

H. Jullien et al. *The Microwave Reaction of Phenyl Glycidyl Ether with Aniline on Inorganic Supports: A Model for the Microwave Crosslinking of Epoxy Resins*, Polymer 37(15):3319–3330, 1996.

A. Kareiva et al., *Carboxylate–Substituted Alumoxanes as Processable Precursors to Transition Metal–Aluminum and Lanthanide–Aluminum Mixed–Metal Oxides: Atomic Scale Mixing via a New Transmetalation Reaction*, Chemistry of Materials 8(9):2331–2340, 1996.

R. Kasemann et al., *Coatings for Mechanical and Chemical Protection Based on Organic–Inorganic Sol–Gel Nanocomposites*, New Journal of Chemistry 18(10):1117–1123, 1994.

H. Katz et al. *Handbook of Fillers and Reinforcements for Plastics*, Van Nostrand Reinhold Company, pp. 11–50, 1978.

Y. Kimura et al., *Coordination Structure of the Aluminum Atoms of Poly(Methylaloxane), Poly(Isopropoxylaloxane) and Poly[(Acyloxy)Alaxane]*, Polyhedron 9(2/3):371–376, 1990.

Y. Koide et al., $[Al_5(^tBu)_5(_{\mu 3}\text{–}O)_2(_{\mu 3}\text{–}OH)_2(_\mu\text{–}OH)_2(_\mu\text{–}O_2CPh)_2]$: *A Model for the Interaction of Carboxylic Acids with Boehmite*, Organometallics 14:4026–4029, 1995.

Y. Koide et al., *Alumoxanes as Cocatalysts in the Palladium–Catalyzed Copolymerization of Carbon Monoxide and Ethylene: Genesis of a Structure–Activity Relationship*, Organometallics 15(9):2213–2226, 1996.

J. I. Kroschwitz et al., *Encyclopedia of Polymer Science and Engineering*, vol. 6, Emulsion Polymerization to Fibers, Manufacture, John Wiley & Sons, pp. 322–382, 1985.

C. Landry et al., *Siloxy–Substituted Alumoxanes: Synthesis from Polydialkylsiloxanes and Trimethylaluminium, and Application as Aluminosilicate Precursors*, J. Mater. Chem. 3(6):597–602, 1993.

C. Landry et al., *From Minerals to Materials: Synthesis of Alumoxanes from the Reaction of Boehmite with Carboxylic Acids*, J. Mater. Chem 5(2):331–341, 1995.

P. LeBaron et al., *Polymer–Layered Silicate Nanocomposites: An Overview*, Applied Clay Science 15:11–29, 1999.

A. MacInnes et al., *Chemical Vapor Deposition of Gallium Sulfide: Phase Control by Molecular Design*, Chemistry of Materials 5(9):1344–1351, 1993.

A. MacInnes et al., *Indium Tert–Butylthiolates as Single Source Precursors for Indium Sulfide Thin Films: Is Molecular Design Enough?* J. Organometallic Chemistry 449:95–104, 1993.

F. Mansfeld et al., *Development of Stainless Aluminum*, J. Electrochem. Soc, 138(12):L74–L75, 1991.

K. Nakamae et al., *Studies on Mechanical Properties of Polymer Composites by X–Ray Diffraction: 3. Mechanism of Stress Transmission in Particulate Epoxy Composite by X–Ray Diffraction*, Polymer 33(13):2720–2724, 1992.

S. Pasynkiewicz, *Alumoxanes: Synthesis, Structures, Complexes and Reactions*, Polyhedron 9(2/3):429–453, 1990.

J. Scantlebury et al., *A–Sol–Gel Derived Anti–Corrosion Pigment*, Advances in Corrosion Protection by Organic Coatings, J. Corrosion Science and Engineering, Abstract 22, Cambridge, Sep. 1999.

H. Schmidt et al., *Chemistry and Applications of Inorganic–Organic Polymers*, Mat. Res. Soc. Symp. Proc., vol. 73, pp 739–750, 1986.

H. Schmidt et al., *Inorganic–Organic Hybrid Coatings for Metal and Glass Surfaces*, American Chemical Society, pp. 331–347, 1995.

H. Schmidt et al., *Sol–Gel–Based Inorganic–Organic Composite Materials*, American Chemical Society, pp. 183–194, 1994.

N. Shahid et al., *Use of Carboxylate–Alumoxanes as Functionalized Cross–Linking Agents in the Preparation of Composite Resin Materials*, 221st ACS National Meeting, San Diego, CA, Apr. 1–5, 2001.

N. Shahid et al., *Use of Carboxylate–Alumoxanes as Functionalized Cross–Linking Agents in the Preparation of Composite Resin Materials*, ACS Joint Southeast–Southwest Regional Meeting, Dec. 6–8, 2000.

M. Stevens, *Polymer Chemistry, An Introduction*, Second Edition, Oxford University Press, pp. 374–379, 1990.

C. Vogelson et al., *Inorganic–Organic Hybrid and Composite Materials Using Carboxylate–Alumoxanes*, Proceedings of the 9th Cimtec–World Ceramics Congress, pp 499–506, Jun. 14–19, 1998.

C. Vogelson et al., *Inorganic–Organic Hybrid and Composite Resin Materials Using Carboxylate–Alumoxanes as Functionalized Cross–Linking Agents*, Chem. Mater. 12(3):795–804, 2000.

C. Vogelson et al., *Fiber Reinforced Epoxy Resin Composite Materials Using Carboxylate–Alumoxanes as Cross–Linking Agents*, Mat. Res. Soc. Symp. Proc., vol. 581, pp 369–374, 2000.

C. Vogelson et al., *Epoxy Resin Materials Using Functionalized Carboxylate–Alumoxanes as Cross–Linking Agents*, ACS Meeting, Joint 55th Southwest/15th Rocky Mountain Regional Meeting, El Paso, Texas, Oct. 21–23, 1999.

C. Vogelson et al., *Inorganic–Organic Epoxy Resin Materials Using Functionalized Carboxylate–Alumoxanes as Cross–Linking Agents*, ACS Meeting, New Orleans, Louisiana, Aug. 21–26, 1999.

C. Vogelson et al., *Inorganic–Organic Epoxy Composite Materials Using Carboxylate–Alumoxanes*, ACS Meeting, Dallas, Texas, Mar. 29–Apr. 2, 1998.

C. Vogelson et al., Slides presented at 9th Annual World Ceramics conference in Florence, Italy, Jun. 1999.

G. Whitesides et al., *Molecular Self–Assembly and Nanochemistry: A Chemical Strategy for the Synthesis of Nanostructures*, Science 254:1312–1319, Nov. 1991.

B. Yoldas, *Alumina Gels that Form Porous Transparent $Al_2O_3$*, Journal of Materials Science 10:1586–1960, 1975.

* cited by examiner active corrosion inhibition

RELEASABLE CORROSION INHIBITOR COMPOSITIONS

CROSS-REFERENCE TO RELATED APPLICATIONS

This application is a continuation-in-part of U.S. patent application Ser. No. 10/171,402 and a continuation-in-part of U.S. patent application Ser. No. 10/171,422, both filed on Jun. 12, 2002, both now pending, both which are incorporated by reference to the extent not inconsistent with the disclosure herewith.

STATEMENT REGARDING FEDERALLY SPONSORED RESEARCH OR DEVELOPMENT

This invention was made, at least in part, with funding from Navy Contract No. N00014-96-0147, and Air Force Contract No. F33615-99-C-5013. The United States government may have certain rights in the invention.

FIELD OF THE INVENTION

This invention relates generally to compositions of matter and methods of preparation of surface modified aluminum oxyhydroxide particles that release one or more types of corrosion inhibitors when triggered by corrosion products. Corrosion inhibitors are anchored to the particles through a carboxylic acid. Hydroxide ions generated from the corrosion of metals triggers release of the corrosion inhibitors from the particles. The particles carrying the corrosion inhibitors are incorporated into protective coatings to inhibit corrosion on metals and alloys such as iron, aluminum, copper, magnesium, nickel, brass and bronze.

BACKGROUND OF THE INVENTION

The corrosion of metals has widespread economic and environmental effects and also has a significant impact on public safety and health. The annual cost of corrosion to the US is estimated to be approximately 3% of GDP. A substantial part of that cost is due to atmospheric corrosion, and protection against atmospheric corrosion constitutes about 50% of all corrosion protection measures. Corrosion has led to bridge collapses, fatal airplane and train crashes, and the leakage and subsequent explosion of natural gas pipelines. The environmental health effects attributed to corrosion are also widespread. Structures such as storage tanks, pipelines, ships, railcars, and tanker trucks, which store and/or transport hazardous materials can be weakened and made unsafe by corrosion, and corrosion is also the leading cause of leaking chemical storage tanks.

Protective organic coatings (also known as paints) are one of the most cost-effective methods of preventing the corrosion of metals. These protective organic coatings are typically polymeric. In typical practice, the protective organic coating is applied over an inorganic conversion coating. The protective organic coating may comprise one or more layers of different organic coatings. The first layer is typically an epoxy that adheres well to the conversion coating and has excellent chemical and barrier properties. The epoxy coating is typically overlaid with a second coating, such as polyurethane, that is more resistant to weathering than the epoxy.

Conversion coatings are produced directly on the metal surfaces by treatment with a chemical agent [such as a soluble chromate or zinc phosphonate] to passivate or seal the surface. Conversion coatings are thin, new phases produced by the reaction of the metal and the chemical agent and are typically either metal phosphates or metal chromates. The conversion layers can enhance adhesion of the protective organic coating to the metal, provide an enhanced barrier to corrosion and can contain corrosion inhibitors.

The primary function of the protective organic coating is to prevent corrosion by physically blocking agents that cause corrosion (water, solubilizing organic or inorganic anions, certain oxidizing agents, etc.) from reaching the metal surface. However, this approach is defeated if the coating has a defect, if the coating becomes damaged or simply if water or other corrosive agents slowly penetrate through the intact coating. In order to deal with under-coat corrosion, or corrosion that occurs when the coating is damaged or defective, soluble or dispersible corrosion inhibitors are often added to the protective organic coatings.

A corrosion inhibitor for use in coatings is generally a soluble or dispersible material that is incorporated into the coating and can be transported by convection or diffusion to the site of corrosion where it slows down the corrosion reaction. The corrosion inhibitor must therefore be mobile and be able to migrate to the corrosion site, because the site is often a scratch or a gap in the coating that is not directly in contact with the coating itself.

Corrosion inhibitors can be divided into two broad categories, those that enhance the formation of a native protective oxide film through an oxidizing effect and those that inhibit corrosion by selectively adsorbing on the metal surface and creating a barrier that prevents access of the corrosive agent to the surface. In the former group are materials such as inorganic chromates, inorganic nitrates, molybdates and organic nitrates. The latter group includes materials such as carbonates, silicates and phosphates and organic molecules. containing heteroatoms such as nitrogen, sulfur, phosphorus and oxygen (e.g. materials such as anthranilic acid, thiols, organic phosphonates and organic carboxylates). Some of these materials also act as poisons for the cathodic oxygen reduction reaction that is linked to the anodic dissolution of the metal. Slowing down the cathodic reaction slows down the overall corrosion reaction.

Soluble chromates are widely used corrosion inhibitors due to their high effectiveness in arresting corrosion. Chromates are highly effective corrosion. inhibitors because they simultaneously provide several mechanisms to retard corrosion. (Frankel, G. S. and R. L. McCreery, "Inhibition of Al Alloy Corrosion by Chromates," J. Electrochem. Soc., Interface, Winter, 34–38, 2001). Soluble chromates are oxidizing compounds that can also react with the corroding surfaces of aluminum and steel to provide an insoluble and a somewhat hydrophobic barrier. Chromates are also thought to inhibit corrosion by poisoning of the oxygen reduction reaction and inhibiting the initiation of corrosion. In current practice, high concentrations of chromates (sometimes up to 50% by weight) are added to the protective coating to provide a reservoir of the corrosion inhibitor so that a high level of corrosion protection can be maintained over several years, even in severe environments.

Unfortunately, soluble chromate corrosion inhibiting additives have adverse environmental effects, and there is a widely recognized need for non-chromate corrosion inhibitors. The toxic properties of chromates are well documented. The Public Health Service (ACGIH 1986/Ex. 1–3, p. 140) reports nasal irritation, evidence of liver enlargement and kidney dysfunction among chromate workers exposed to 0.06 to 0.07 mg Cr(VI)/m$^3$. This report also cites excess lung cancer among chromate workers exposed to 0.01 to 0.15 mg/m$^3$ soluble chromate and 0.1 to 0.58 mg/tm$^3$ insoluble chromate. The use of chromate-inhibited spray-on coatings creates inhalable chromate tainted dusts. Removing chromate-inhibited coatings by chemical or mechanical means also generates a hazardous chromated waste that requires expensive disposal.

A number of chromate-like inorganics (e.g. molybdates, vanadates, and manganates) have been proposed as replacements for chromate conversion coatings and as additives for protective coatings (Cohen, S. M. "Replacements for Chromium Pretreatments on Aluminum", Corrosion, 51(1), 71–78, 1995). Rare earth materials such cerium have also been evaluated as corrosion inhibitors (Mansfeld, F., V Wang and H. Shih "Development of "Stainless Aluminum", J. Electrochem. Soc., 138(12), L74–L75, 1991). However, heavy metal chromate replacements may also be strictly regulated in the future.

Organic corrosion inhibitors are an alternative to the toxic heavy metal corrosion inhibitors currently used in. coatings. The inhibition of corrosion of a metal or an alloy by organic corrosion inhibitors can be achieved by many mechanisms, the effectiveness of which depends on many factors; including the nature of the metal, the oxidation-reduction potential of the environment, the temperature, and the concentration and strength of adsorption of the organic molecule to the metal surface. Organic corrosion inhibitors are generally low to moderate molecular weight molecules that primarily prevent corrosion by either reacting with the surface of the metal, its oxide, or its corrosion products to form a thin film. (Kuznetsov, Y. I., J. G. N. Thomas and A. D. Mercer. "Organic Inhibitors of Corrosion of Metals", Plenum Pub Corp. 1996). Highly effective organic corrosion inhibitors generally interact with the metal via chemical adsorption. Chemical adsorption involves the formation of a coordinate bond between the metal surfaces and the organic corrosion inhibitor. The nature of the metal and the structure of the organic have a decisive effect on the strength of the bond and therefore the efficiency of the organic corrosion inhibitor. Organic corrosion inhibitors generally have donor atoms such as S, O and N that can donate electrons to the metal, thereby forming the coordinate bond. All other things being equal, higher electron density and larger polarizabilities usually lead to better corrosion protection, as known in the art. Because film formation is a chemical adsorption process, the temperature and the concentration of the inhibitors are also important factors in determining the effectiveness of the organic corrosion inhibitors. Corrosion inhibitors can be added directly to the protective organic coating, and using several different corrosion inhibitors can produce a synergistic effect For example, combinations of oleic acid and phenyl anthranilate have been reported to be significantly more effective than either of the inhibitors alone (Kuznetsov, Y. I., J. G. N. Thomas and A. D. Mercer. "Organic Inhibitors of Corrosion of Metals", Plenum Pub Corp. (1996)).

Although there are numerous organic compounds that are excellent corrosion inhibitors in solution (V. S. Sastri, Corrosion Inhibitors: Principles and Applications, John Wiley and Sons, Chichseter, England 1998), these materials have yet to find widespread use in protective organic coatings. The primary technical reason for their lack of use is that the best organic corrosion inhibitors work because they contain functional groups (e.g. amines, amides, thiophenes, carboxylic acids, etc.) that form strong bonds to the metal surfaces. These same functional groups, can unfortunately, also react with the polymer resins used to produce the coating. The corrosion inhibitor is then locked into the polymer chain, thereby immobilizing it and preventing it from diffusing to the paint/metal interface where it is needed to block corrosion.

Even if the organic corrosion inhibitors are designed so that they would not be locked into the polymer structure (e.g. using latent reactive groups), when the corrosion-inhibited coatings are exposed to water (e.g. rain or aqueous detergent solutions used to clean the coatings), the inhibitors can be lost from the film by leaching, migration or extraction. The loss of inhibitor reduces the effectiveness and useful service lifetime of the coating. However, to work, the corrosion inhibitor must be able to diffuse through the coating to reach the corrosion site; especially if a hole or a scratch in the coating produced the corrosion site. Unfortunately, it is this mobility that allows the corrosion inhibitor to escape from the coating. Furthermore, if the coatings contain toxics (as do the currently used chromated epoxies), the toxics can be leached into the environment. In addition, adding a high concentration of a corrosion inhibitor to a coating can change the physical properties and chemical properties of a coating, often for the worse.

One way of solving these problems (e.g. immobilization of the inhibitor by reaction with the coating resins, loss to the environment and degradation of film properties) is by encapsulating the inhibitor molecule and using the encapsulant as an anti-corrosion pigment in a paint (J. D. Scantlebury and Dezhu Xiu, Journal of Corrosion Science and Engineering Abstract 22: A Sol-gel derived anti-corrosion pigment, http://www.umist.ac.uk/corrosion/JCSE/). Another approach is to ion-exchange the corrosion inhibitors onto a particle surface. Compositions that release corrosion inhibiting agents from particles include ion-exchange resins, ion-exchanged zeolites and carbon molecular sieves, ion-exchanged solid particles and water soluble glasses.

U.S. Pat. No. 3,899,624 discloses the use of organic ion-exchange resins incorporating corrosion inhibiting anions or cations and the release of said ions into a paint to arrest corrosion by ion exchange. The corrosion inhibiting ions include zinc and chromates. U.S. Pat. No. 4,738,720 discloses the use of a calcium ion-exchange zeolite composition and its use in a paint. H856, a statutory invention registration, discloses the use of calcium and barium exchanged Y-zeolites and their incorporation into a paint as corrosion inhibitors for steel panels.

U.S. Pat. Nos.6,383,271B1 discloses the use of fillers with hollow cellular structures such as diatomaceous earth, zeolite or carbon, wherein the hollow cells or pores are loaded with inhibitors or antioxidants as corrosion inhibitors for paints. Inhibitors disclosed include carbonic acids, amines, ketones, aldehydes, heterocyclic compounds, phosphates, benzoates, silicates, vanadates, tungstates, zirconates, borates, or molybdates.

U.S. Pat. Nos. 4,405,493, 4,419,137, 4,459,155, 4,474, 607, 4,594,369, 4,643,769, 4,687,595, 4,749,550, 4,795,492, and 5,041,241 disclose compositions of alumina and silica inorganic particles whose surfaces are ion exchanged with corrosion inhibiting cations and anions including calcium, zinc, cobalt, lead, strontium, lithium, barium, magnesium, yttrium or cations of one or more metals of the lanthanide group, phosphates, chromates, benzoates or molybdates. The ion exchanged particle surfaces release their cations and ions via a subsequent ion-exchange thereby providing corrosion to metal substrates. U.S. Pat. Nos. 4,405,493, 4,419, 137, 4,459,155, 4,474,607, 4,594,369, 4,687,595, 4,749,550, 4,795,492, 5,041,241 also provide for the incorporation of the ion-exchanged particles as corrosion inhibitors in paints.

In the above patents the corrosion inhibitors are ion-exchanged onto particle surfaces having ion-exchangeable groups. The corrosion inhibitors are released from the particle surfaces by a subsequent ion exchange with ions (e.g. chlorides, sulfates, sodium ions) transported into the coating via water penetrating through the coating. The present invention provides for chemically anchoring carboxylic acids to the surface of aluminum oxyhydroxide surfaces, as evidenced by quantum mechanical calculations based on Density Functional Theory and solid-state NMR studies. The chemically anchored corrosion inhibitors of the present invention are not released by ion-exchange, but they are released by chemical disruption of the carboxylate bond between the corrosion inhibitor and the aluminum oxyhydroxide surface.

U.S. Pat. Nos. 4,210,575, 4,428,774, 4,346,184, 4,518,429, and 4,561,896 disclose water soluble glass compositions, including as its major constituents phosphorous pentoxide and either zinc oxide or calcium oxide, which together form the glass forming oxide and glass modifying oxide respectively of the glass, together with a minor proportions of one or more oxides of an element or elements of Group IIA or Group IIIB of the periodic table, the compositions of the glass being such that, when the glass is contacted with water, phosphate ions and either zinc or calcium cations are leached into solution. The leached ions are disclosed as effective in the corrosion protection of iron or steel surfaces. These patents disclose that the glass material can be dispersed in a resin carrier, and thereby release corrosion inhibiting ions into the coating when the glass composition is contacted with water. In U.S. Pat. Nos. 4,210,575, 4,428,774, 4,346,184, 4,518,429, and 4,561,896, the corrosion inhibitors that comprise the water soluble glass are released when the glass dissolves upon contact with water.

U.S. Pat. No. 5,489,447 discloses the use of carrier bound ketocarboxylic acids as corrosion inhibitors. The ketocarboxylic acids are preferably bound to the surfaces of oxides, hydroxides, silicates or carbonates, where examples of these materials are alumina, magnesium oxide, aluminum hydroxide, magnesium hydroxide, kieselguhr, talc, aluminium silicate, calcium carbonate or iron oxide. These materials are incorporated into paints where they are disclosed to arrest corrosion.

In the present invention the material to which the corrosion inhibitors are chemically anchored are aluminum oxyhydroxides or inorganic particles that are fully or partially covered with aluminum oxyhydroxides, a class of materials not disclosed in U.S. Pat. No. 5,489,447. Furthermore, in the present invention the materials are designed to release the corrosion inhibitors under certain conditions, e.g. alkaline environments with pH greater than 9. The present invention provides for an improvement over the above disclosures. In all of the inventions described above (excepting U.S. Pat. No. 5,489,447), the materials are designed to release the corrosion inhibitors over time whether or not there is any corrosion occurring at the metal surface. The concentration of the organic inhibitor may therefore be reduced by leaching of the corrosion inhibitor from the coating before corrosion occurs. This reduces the effectiveness of the inhibitor and the effective service life of the coating.

The present invention describes methods and materials for providing the triggered release of organic corrosion inhibitors from particle carriers. The invention also provides for incorporating these corrosion inhibiting particles into protective organic coatings. In this invention, corrosion inhibitors are chemically anchored to a particle surface through a labile chemical bond that can be broken by interaction with hydroxide ions generated by corrosion of the metal surface. In the presence of oxygen most metals of practical interest corrode by anodic dissolution of the metal and cathodic reduction of oxygen, e.g.

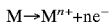

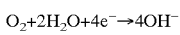

The basic hydroxide ions generated by the corrosion process break the chemical bond between the corrosion inhibitor and the particle, and thereby release the previously anchored and immobilized corrosion inhibitor into the protective organic coating. In the present invention the corrosion inhibiting particles comprise one or more organic corrosion inhibitors that are covalently anchored to an aluminum oxyhydroxide surface through a carboxylic acid.

The triggered release of the anchored corrosion inhibitors from the aluminum oxyhydroxide surfaces of the present invention is observed when an aqueous dispersion of the carboxylate-anchored surface modified pseudoboehmite/boehmite particles is titrated. Above pH 6 to about pH 9 the solution viscosity increases, but no precipitation is observed. FTIR of the particles recovered from solution in this pH range shows that the organics are still anchored to the surfaces of the particles. However, above ~pH 9, the particles precipitate out of solution. FTIR of the particles recovered from the latter experiment show no organic anchored to the surface and the quantitative recovery of the organics from the solution was achieved. Thus, the bond between the carboxylic acid and the pseudoboehmite/boehmite surfaces is unstable in basic conditions (i.e. above ~pH 9).

There are several advantages to the present invention. The release of corrosion inhibitors is linked to and triggered by the corrosion process. Since the release of the organic corrosion inhibitors occurs only when triggered by the corrosion processes, this minimizes the amount of corrosion inhibitor that can be leached out of the coating. Secondly, the invention allows multiple organic corrosion inhibitors to be incorporated simultaneously into a protective polymer coating at concentrations sufficient to inhibit corrosion without degrading the physical properties and performance of the coating (either by anchoring different types of inhibitors to a single particle or by using two or more types of particles each with a single type of inhibitor attached). This means organic corrosion inhibitors that are active over a wide range of pH conditions (corrosion can also be occurring at additional sites where the electrolyte conditions are neutral or acidic) are available in the coating for arresting corrosion. The ability to chemically anchor multiple types of releasable corrosion inhibitors to the particle carriers is also important since numerous studies have shown that mixed organic corrosion inhibiting agents can have a synergistic effect.

The materials described in the present invention are of class of materials known as alumoxanes. U.S. Pat. No. 5,593,781 discloses preparation of alumoxanes by surface modification of pseudoboehmite powders of nanometer size particles with small molecular weight organic compounds in a one-step process by dispersing the ceramic powder in water or an organic solvent and adding the low molecular weight organic compound. Apblett et al. [Mat. Res. Symp. Proc. Vol. 249 1992] also disclose the formation of carboxy substituted particles from the reaction of pseudoboehmite and carboxylic acids in a one-step process. Landry et al. [J. Mater. Chem. 1995, 5(2), 331–341] describe the reaction of [Al(O)(OH)]n with carboxylic acids to form [Al(O)x(OH)y(O2CR)z]n where R=C1–C13 and 2x+y+z=3 using a one-step reaction. U.S. Pat. No. 6,369,183 discloses thermoset polymer networks formed from surface modified carboxylate-anchored amine, hydroxyl, acrylic and vinyl modified aluminum oxyhydroxide particles. However, the above patents do not disclose the use of carboxylate surface-modified aluminum oxyhydroxide particles or inorganic (non-aluminum oxyhydroxide) particles whose surfaces are coated with an aluminum oxyhydroxide and then carboxylate surface modified that provide for the triggered release of corrosion inhibitors

SUMMARY OF THE INVENTION

The present invention relates to a new class of corrosion inhibiting materials for protective coatings that provide for the triggered release of corrosion inhibitors, methods of making the corrosion inhibiting materials, methods of using the corrosion inhibiting materials, and coatings containing the corrosion inhibiting materials The materials comprise one or more corrosion inhibitors that are chemically anchored to a particle having an aluminum oxyhydroxide surface through the carboxylate end of an organic carboxylic acid. The said corrosion inhibitors may themselves contain the carboxylic acid and be directly chemically anchored to the aluminum oxyhydroxide surface or the corrosion inhibitors may be grafted to the particle having an aluminum oxyhydroxide surface by chemical reaction with functional groups that are present in a carboxylic acid that is chemically anchored to the aluminum oxyhydroxide surface through the carboxylate functionality. The release of the corrosion inhibitor from the aluminum oxyhydroxide surface is triggered by disruption of the particle-carboxylate bond under corrosion-causing conditions (e.g. the strongly basic conditions generated by the cathodic oxygen reduction reaction that is part of the corrosion process, or other conditions that cause the particle-carboxylate bond to break).

The present invention also allows multiple types of corrosion inhibitors to be incorporated into a protective coating, preferably at concentrations sufficient to inhibit corrosion without degrading the physical properties and performance of the coating, either by adding particles having several different types of corrosion inhibitors chemically anchored to the particle surface or by adding several types of particles, each with a different type of corrosion inhibitor chemically anchored to the particle surface to the coating. This approach allows corrosion inhibitors that act via different mechanisms and at different pHs to be incorporated into the coating via the particles so that different types of corrosion inhibitors can be released to the corrosion site.

Furthermore, additional compounds (for example, low molecular weight compounds or oligomers or polymers that may or may not be corrosion inhibitors (including polyethers, polyesters, alkanes, polyaromatics, polysilicones), and other desired substances, as known in the art), can be chemically grafted to the carboxylate-derivatized particles. These additional compounds include substances that improve the dispersibility of the particles (including polyethylene oxides, polyacrylates, stearic acid, and other desired substances, as known in the art), substances that improve the compatibility of the particles with the coating, such as epoxy diluents (including Heloxy 65 adducted to an anchored amine, Tomah PA14 adducted to an anchored acrylate, and other desired substances, as known in the art), or substances that improve the adhesion of the coating with the metal surface (including polyacrylates, polyesters, and other desired substances, as known in the art). The corrosion inhibitors and. additional compounds may be chemically anchored directly to the surface of the particle through a carboxylate bond or can be chemically grafted to the particle surface though functionalized carboxylic acid(s) that were previously anchored to the particle.

More specifically, provided is a corrosion inhibiting material for use as an additive for a protective organic coating comprising: a particle having an aluminum oxyhydroxide surface; and one or more organic structures having corrosion inhibiting properties that are anchored to the aluminum oxyhydroxide surface via carboxylate groups.

Methods of making the materials and their uses are also described herein. The particles may be used in a variety of different ways in a variety of applications, as will be apparent to one of ordinary skill in the art For example, the materials may be incorporated into coatings (such as polymers) or paints applied to a metal surface. The materials can also be incorporated into powder coatings and baked onto a surface. Also the materials can be incorporated into a polymer by a solvent process and then flame sprayed onto a surface. These uses are known to one of ordinary skill in the art.

The preferred particles of the present invention are materials having the crystal structure related to boehmite and having surface areas of at least 10 $m^2/g$ or higher. Preferably, the surface areas should be 100 $m^2/g$ to 300 $m^2/g$ or higher. High surface areas are preferred since they allow a higher quantity of corrosion inhibitor to be delivered into the coating. Preferred particles are also a form of boehmite known as pseudoboehmite. The particles can also be inorganic materials having a boehmite surface. The particles serve as the carriers for the anchored corrosion inhibitors. The particles are described further below. In the most preferred embodiment the core and surface of the particles are both made of the same material, pseudoboehmite [$AlOOH.x(H_2O)$]. The particles are composed of either aluminum oxyhydroxide, or have or can form an aluminum oxyhydroxide surface covering at least 5% of the particle. Surface modification procedures have been developed to chemically graft a range of surface modifiers to the carboxylate-derivatized inorganic particles.

As used herein, an "anchor" is a carboxylate group that chemically bonds to the surface of the particle. As used herein "particle" or a "particle having an aluminum oxyhydroxide surface" includes particles of aluminum oxyhydroxide (for example, boehmite or pseudoboemite), particles that have a surface of aluminum oxyhydroxide and a core of a different substance, and particles that can form a surface of aluminum oxyhydroxide. "Surface" does not necessarily indicate a uniform layer of material is present. For example, there may be portions with no material, or the surface may be unevenly thick. When a corrosion inhibitor is "grafted" or "attached" or "anchored" or "chemically anchored" to a carboxylate group anchored to the aluminum oxyhydroxide surface, there may be one or more intermediate groups between the corrosion inhibitor and the carboxylate group, or the corrosion inhibitor may be directly chemically grafted (i.e., one bond) to the anchored carboxylate group. The intermediate groups may be bifunctional, i.e., contain a different reactive group on each end, or may be difunctional, i.e., contain the same reactive group on each end. "Corrosion inhibitor" is a structure that includes at least one portion that reduces at least one effect of corrosion.

DETAILED DESCRIPTION OF THE INVENTION

Figure 1:
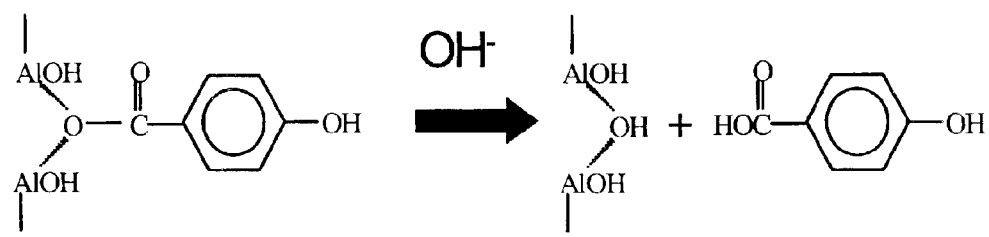
FIG. 1 shows the release of a carboxylate anchored corrosion inhibitor from an aluminum oxyhydroxide surface.

The invention may be further understood by reference to the following discussion and examples.

Aluminum oxyhydroxide is to be broadly construed to include any material whose surface is or can be processed to form a surface or layer of boehmite, including specifically aluminum metal, aluminum nitride, aluminum oxynitride (AlON), $\alpha$-$Al_2O_3$, $\gamma$-$Al_2O_3$, transitional aluminas of general formula $Al_2O_3$, boehmite ($\gamma$-AlO(OH)), pseudoboehmite ($\gamma$-AlO(OH).$xH_2O$ where 0<x<1), diaspore ($\alpha$-AlO(OH)), and the aluminum hydroxides ($Al(OH)_3$) of bayerite and gibbsite.

Boehmite and pseudoboehmite are aluminum oxide hydroxides of the general formula $\gamma$-AlO(OH).$xH_2O$. When x=0 the material is called boehmite; when x>0 the materials incorporate water into their crystalline structure and are known as pseudoboehmite. Boehmite and pseudoboehmite are also described as $Al_2O_3$.$zH_2O$ where, when z=1 the material is boehmite and when 1<z<2 the material is pseudoboehmite. The above materials are differentiated from the aluminum hydroxides (e.g. $Al(OH)_3$, bayerite and gibbsite) and diaspore ($\alpha$-AlOOH) by their compositions and crystal structures. Boehmite is usually well crystallized with a structure in accordance with the x-ray diffraction pattern given in the JCPDS-ICDD powder diffraction file 21–1307, whereas pseudoboehmite is less well crystallized and generally presents an XRD pattern with broadened peaks with lower intensities. For the purposes of this specification, the term 'boehmite' implies boehmite and/or pseudoboehmite.

Particles with aluminum oxyhydroxide surfaces can be formed by a number of methods known in the art. For materials containing aluminum, including but not limited to aluminum metal, aluminum nitride, aluminum oxyhydroxide (AlON), $\alpha$-$Al_2O_3$, $\gamma$-$Al_2O_3$, transitional aluminas of general formula $Al_2O_3$, diaspore ($\alpha$-AlO(OH)), and the aluminum hydroxides ($Al(OH)_3$) of bayerite and gibbsite, a boehmite surface can be formed, for example, by the treating the aluminum atom-containing material with water at temperatures between 80° C. and 300° C. The water can be either in the liquid state or the vapor state and other materials (e.g. bases or acids) can be added to change the rate of formation and thicknesses of the boehmite surface.

Aluminum oxyhydroxide surfaces can also be formed by addition of aluminum alkoxides to aqueous dispersions of inorganic particles. The particles can also be dispersed in other hydrophilic solvents such as alcohols that also contain some amount of water. Additionally the surface can be prepared by a passing a volatile aluminum-containing compound (e.g. $AlCl_3$, $AlEt_3$) in the presence of oxygen and water through a fixed bed or fluidized bed of inorganic particles.

In the simplest embodiment of the invention, a single type of corrosion inhibitor is chemically anchored to the surface of the particles using the synthetic procedures described below. The same procedures can be used to chemically anchor many different types of corrosion inhibitors to the surface of the particles. Useful concentrations of particles in the coating depends on the application and the anchored corrosion inhibitor, as known in the art, but generally, a preferred concentration range gives between 0.5 and 0.05 corrosion inhibitors per number of surface Al. The useful concentration range for the chemically anchored corrosion inhibitors is 2:1 (Al:Corrosion inhibitor, where the Al concentration is the number of surface Al atoms) to 100:1 (Al:Corrosion inhibitor).

The corrosion inhibitors are anchored to the surface of the particle though a carboxylic acid functional group. In one embodiment of the invention, a corrosion inhibitor-containing carboxylic acid is bonded to the surface of the particles and the particles are incorporated into a coating. However, many corrosion inhibitors do not contain a carboxylic acid in their structure. Therefore, to afford the widest selection of surface modifications, a multistep surface modification procedure has been developed to chemically graft additional types of corrosion inhibitors to the particles. These modifications are described in detail in U.S. patent applications Ser. No. 10/171,402 and Ser. No. 10/171,422, both are now pending, which are hereby incorporated by reference. A brief description of the surface modification process is described below (and see FIGS. 3 and 4)

Figure 3:
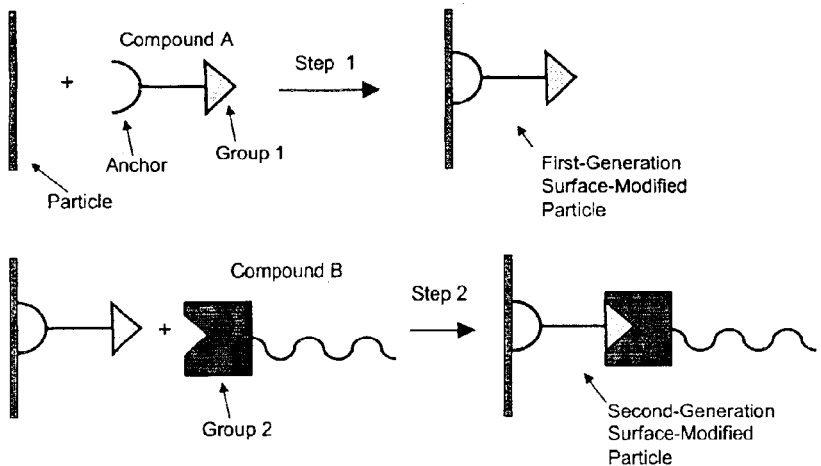
FIG. 3 shows a two-step procedure for bonding corrosion inhibitors (or other compounds) to an aluminum oxyhydroxide surface.
Figure 4:
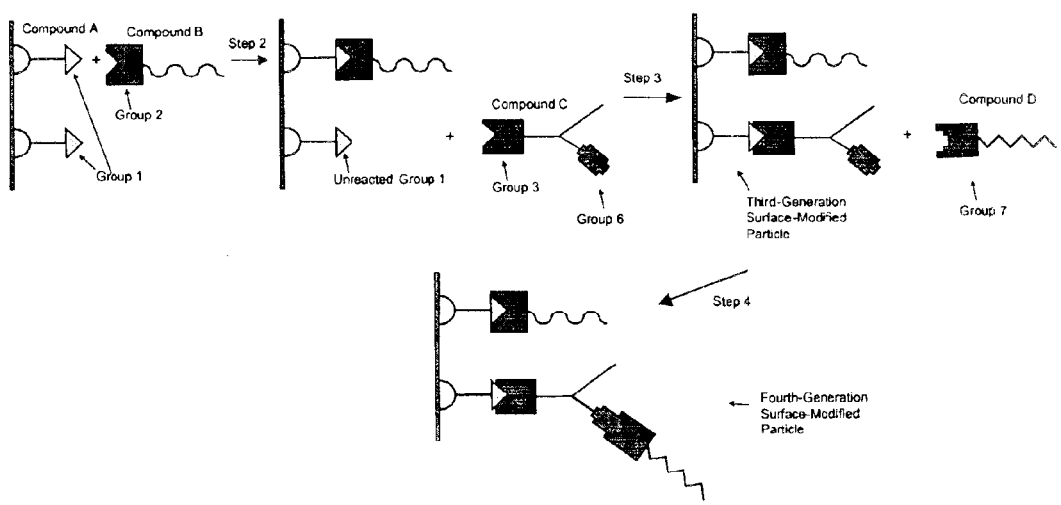
FIG. 4 shows a general multi step procedure for grafting a corrosion-inhibitors (or other organic structures) to a reactive organic that is anchored via a carboxylate group to an aluminum oxyhydroxide surface.

Referring to FIGS. 3 and 4 for illustration, the multi-step surface modification process involves two or more reactions. The initial step (Step 1) comprises the chemically anchoring of a carboxylic acid to the surface of the particle. The carboxylic acid is anchored to the surface of the particles through the oxygens of the carboxylate group (the Anchor, FIG. 3). These carboxylic acids (Compound A, FIG. 3) contain at least two reactive functional groups comprising at least a carboxylic acid anchoring group (Anchor, FIG. 3) that reacts with the surface of the particle, and, when anchored to the particle, another reactive functional group (Group 1, FIG. 3) that is available for subsequent reactions. The subsequent (second) step grafts a second compound (Compound B) to the previously chemically anchored Compound A. Compound B contains at least one reactive group (Group 2 FIG. 3) that reacts with the Group 1 of the Compound A forming a linkage (Step 2). Compound B could be a corrosion inhibitor, or a compound whose composition is chosen to improve the dispersion and compatibility of the particles with the coating matrix, or a compound with two reactive groups to act as a spacer for grafting the corrosion inhibitor in a subsequent step. The multistep synthetic procedure may be repeated to provide a longer molecular backbone to which the corrosion-inhibitor can be bonded. The multistep synthetic procedure can also be used to bond several different corrosion inhibitors to the same particle. The selection of appropriate carboxylic acids, reactive groups, corrosion inhibitors and other compounds is dependent on the application, and is understood by one of ordinary skill in the art. By appropriate selection of carboxylic acids, reactive groups, corrosion inhibitors and other compounds, the reactivity and functionality of the particle can be tailored for a particular application.

In the above embodiment (see FIGS. 3 and 4) the carboxylic acid is defined as a small organic molecule containing less than 40 carbon atoms and comprising at least one carboxylate group (anchor) and one additional reactive group (Group 1) that reacts with Compound B. Compound B may be the active component of the corrosion inhibitor or may be a linkage group between the carboxylic acid and the active component of the corrosion inhibitor. The chemical grafting reaction (Step 2) is the reaction between a functional group on Compound B and the functional group (Group 1) on the carboxylate-anchored Compound A. During Step 2, Group 1 of Compound A reacts with Group 2 of Compound B forming a linkage bond.

Group 1 is a chemical entity capable of undergoing a non-polymerization reaction that comprises carbon-carbon double bonds, electrophilic carbon-carbon double bonds, carbon-carbon triple bonds, electrophilic carbon-carbon triple bonds, dienes, diynes, polyenes, aromatic rings, heteroaromatic rings, polyaromatic rings, cycloaliphatic compounds, hydroxyl groups, alkoxides, ethers, phenols, phenolate esters, lactones, aldehydes, ketones, quinines, α,β-unsaturated carbonyl compounds, other α,β-unsaturated compounds, carboxylic acids, carboxylate salts, anhydrides, hydroperoxides, enols, enones, epoxides, acetals, peroxycarboxylic acids, carbonates, primary, secondary and tertiary amines, ammonium salts, iminium salts, amine oxides, nitro groups, nitroso groups, azo groups, diazo groups, azides, nitrenes, nitriles, imines, Schiff bases, hydoxylamines, enamines, hydrazines, hydrazones, azines, semicarbazones, oximes, nitrates, nitrites, amides, imines, amidines, cyanohydrins, isocyanates, cyanates, urethanes, urea derivatives, carbamate esters, lactarns, carbammic acids, thiols, disulfides, thiophenols, thioethers, thioesters, thioketones, thioaldehydes, sulfonic acids, sulfonates, organic sulfates, sulfoxides, sulfones, sulfinic acids, sulfines, sulfilimines, sulfones, sulfonamides, sulfonium salts, thioacetals, sulfur yilides, isothiocyanates, thiocyanates, organic sulfites, thiocarbammic acids, phosphonic acids, phosphonates, phosphinic acids, phosphines, phosphonium salt, phosphorous ylides, phosphoranes, phosphites, alkyl halides, alkenyl halides, alkenyl halides, and aryl halides, carbonyl halides, sulfonyl halides, boronic acid groups, boronate salts, silanes, siloxanes, silyl halides, trialkylboranes alkylsilyl derivatives, enolates, silyl enols, enamines, malonic esters, cyanoacetic esters, cyano acetamides, nitroalkanes, and the anions in Scheme 1. These possibilities are representative and not intended to be an exhaustive list of suitable reactive functional groups. Other reactive functional groups are known in the art, and selection of appropriate reactive functional groups is known in the art.

Scheme 1

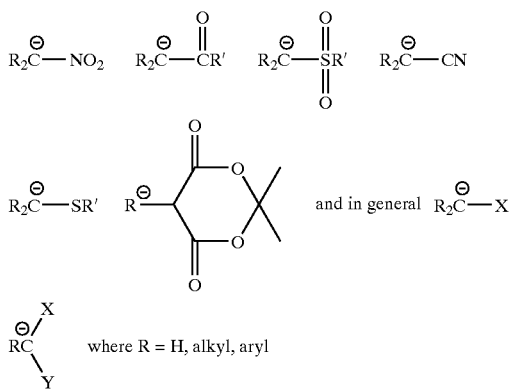

where R = H, alkyl, aryl where X,Y = $NO_2$, COR, COOR, $COO^-$, COOH, $SO_2R$, SR, CN, CHO, SOR, $SO_2OR$, $SO_2NR_2$

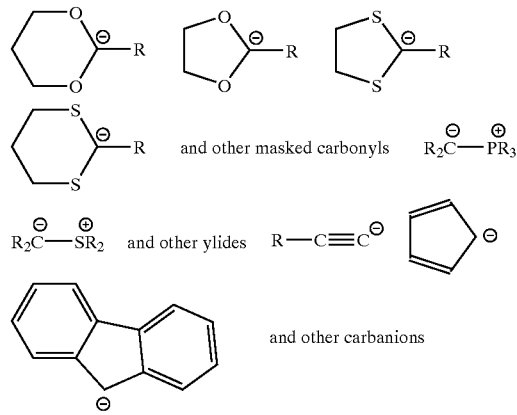

Group 2 is a reactive functional group on Compound B selected from the functional groups of Group 1, such that a reaction between Group 1 on Compound A and Group 2 results in an attachment between Compound A and Compound B.

The chemical grafting reaction (Step 2) is a reaction between two functional groups (Group 1 and Group 2) as understood by people skilled in the art. Step 2 is carried out by selecting a combination of Group 1 and Group 2 functions that react with each other without causing undesired side-reactions, and by choosing the proper reaction conditions that allows the desired reaction to be carried out between the chosen pair of functional groups. This selection process is apparent to people skilled in the art of organic chemistry and is well described in Organic Chemistry Textbooks (for example, March, J. 2001; Furniss, B, 1989). Step 2 can be a substitution reaction (e.g. nucleophilic substitutions, electrophilic substitutions), a condensation reaction (e.g. esterifications, amidations), an addition reaction (to carbon-carbon multiple bonds, to carbon-heteroatom multiple bonds, cycloadditions), a free-radical reaction, or a concerted reaction, or other reaction known to one of ordinary skill in the art.

The reaction sequence(s) can be continued in additional steps using reactions selected from the above reactions. The active component of the corrosion inhibitor may be incorporated as the terminal step in the grafting process or may be incorporated at any step in the grafting process. The reaction sequence(s) can also be used to graft non-corrosion inhibitors to the surface of the aluminum oxyhydroxide particles. These non-corrosion inhibitors can be used for the purpose of compatibilizing the surface of the particle corrosion inhibitors with the protective coating, and other uses, as known in the art.

The corrosion inhibitors that can be anchored to the particles are numerous. Corrosion inhibitors that can be anchored to the surface of the particle (either directly as a carboxylic acid or through reaction with an anchored reactive carboxylic acid) are organics or organometallics that inhibit corrosion of metals and metal alloys, and include but are not limited to materials such as organophosphates, organothiols, organonitrates, nitrogen-heterocyclics, sulfur-heterocyclics, oxygen-heterocyclics, aromatics, ring substituted aromatics, cycloaliphatics, heterocyclic aromatics and cycloaliphatics, sulfides, organo phosphates, olefins, phenols, substituted phenols, quinones, amines, aromatic amines, carboxylates, amine-carboxylates, aromatic amine carboxylates, and salts and/or combinations of any of the above. Preferred corrosion inhibitors are organic or metal-organic complexes or metal-organophosphorous complexes. Particularly effective classes of anchored corrosion inhibitors are chelating agents (i.e. compounds having two or more functional groups positioned so that multiple bonds can be formed with a single atom). These chelants react with metals to form insoluble metal chelates. While these materials generally work by forming insoluble films, these materials can also suppress corrosion in the absence of the formation of a stabilized oxide layer or an insoluble film. In this latter case, the materials are classified as adsorption passivators (Kuznetsov, Y. I., J. G. N. Thomas and A. D. Mercer "Organic Inhibitors of Corrosion of Metals", Plenum Pub Corp. 1996). These materials passivate corrosion via their hydrophobicity. There is thought to be a "squeezing out" of corrosion enabling anions from the metal surface.

There are no universally preferred organic corrosion inhibitors. The corrosion inhibitors to be selected for incorporation onto the nanoparticles depend on the corrosion environment and the metal to be protected, as known in the art Examples of some of the preferred corrosion inhibitors for acid, neutral and alkaline environments are given as follows. For acid environments, materials such as quaternary ammonium compounds, imidazolines, aldehydes, and sulfoxides are capable of inhibiting general corrosion. For neutral solutions, carboxylic acids, mercaptocarboxylic acids, imidazoles, oximes and azoles are effective corrosion inhibitors. For alkaline solutions, materials such as tannins, substituted phenols, substituted quinolines and quinalizarin are highly effective.

The types of corrosion inhibitors described above can be chemically anchored to the nanoparticle surface through a carboxylate anchor or they can be grafted to the nanoparticle by reaction with a functional group that is anchored to the nanoparticle through a carboxylic acid. For example, phenolic acids such as p-hydroxybenzoic acid and 4,4-bis(4-hydroxyphenyl)valeric acid can be chemically anchored directly to the aluminum oxyhydroxide surface through their carboxylate groups. The phenolic acid modified aluminum oxyhydroxide particles can then be incorporated into protective organic coatings and provide corrosion protection. For example, both 4-hydroxybenzoic acid and 4,4-bis(4-hydroxyphenyl)valeric surface modified pseudoboehmite nanoparticles have been incorporated into epoxy and polyurethane coatings, and provided very good corrosion protection to Al-7075 alloys for 2000 hours in a salt fog test.

Furthermore, even better corrosion inhibition can be achieved by anchoring multiple types of inhibitors to the particle surface. For example, chemically anchoring p-hydroxybenzoic acid and oleic acid to the aluminum oxyhydroxide surfaces for subsequent triggered release offers better corrosion inhibition than aluminum oxyhydroxide surfaces modified by either of the individual acids alone.

Even though basic conditions trigger the release of the corrosion inhibitors from the aluminum oxyhydroxide surfaces, corrosion of metals can occur over a wide pH range. Therefore, it is desirable to anchor corrosion inhibitors to the aluminum oxyhydroxide surfaces that can arrest corrosion under neutral or acidic pH environments. When released from the aluminum oxyhydroxide surfaces by alkaline conditions these corrosion inhibitors will diffuse through the coating and arrest corrosion where the surface conditions are neutral or acidic. Anchoring corrosion inhibitors that protect in alkaline, neutral, and acidic environments to aluminum oxyhydroxide particles provides protection over a wide pH range.

Not all of the organic structures that protect against corrosion are available as carboxylic acids that can be anchored directly to the surfaces of the aluminum oxyhydroxide particles. However, the carboxylate-free corrosion inhibitor structures can be chemically grafted to a previously carboxylate-derivatized particle. For example, the particle can be first derivatized using acrylic acid (not normally used as a corrosion inhibitor) and then a corrosion inhibitor such as 2(4-imidazolyl)ethylamine can then be Michael adducted to the surface anchored acrylate. Furthermore, the surface can be simultaneously modified with two or more corrosion inhibitors. For example, both acrylic acid and 4-hydroxybenzoic acid can be anchored to the boehmite surface. An amine containing corrosion inhibitor can then be grafted to the anchored acrylate via a Michael addition reaction. Other addition or substitution reactions known to those skilled in the art of organic synthesis can be carried out with the appropriate reaction pairs as known in the art to graft a wide range of corrosion inhibitors to the derivatized aluminum oxyhydroxide surface particle surface. The corrosion inhibitor-modified particles are then incorporated into a protective organic coating where the corrosion inhibitors are released from the particle surface by reaction with hydroxide ions generated by corrosion of the metal substrate.

The protective coating is generally a polymeric material (organic or inorganic polymer) whose primary function is to provide a physical barrier between the environment and the metal substrate. The protective coating also serves as a carrier or matrix to hold the soluble/dispersible corrosion inhibitor in place. Typical examples of organic protective coatings (e.g. paints) include latexes, amino resins, polyurethanes, epoxies, phenolic resins, acrylic resins, polyester resins, alkyd resins, polysulfide resins and halogenated polymer resins. Other coatings are known in the art. Particles containing corrosion inhibitors and optional additives can be introduced into the coating using the methods of the present invention and other means known in the art, such as adding the appropriate amount of particles with other components of the composition. Corrosion inhibitors that interfere with different mechanisms of the corrosion process can be chemically anchored to the same particles, or alternatively, each corrosion inhibitor can be anchored to a different particle surface. In the latter case, several different types of surface modified particles are added to the protective coating. The chemically anchored corrosion inhibitors can then be released into the coating and thus to the metal surface by the action of hydroxide ions generated by the cathodic oxygen reduction reaction on metals such as iron and aluminum. High concentrations of multiple corrosion inhibitors can incorporated into the protective coating via the particle carriers without degradation of the properties of the protective coating.

In addition to anchoring corrosion inhibitors to the particle surface, one or more non-corrosion inhibiting groups may be anchored to the particle surface. The non-corrosion inhibiting groups provide other functions than corrosion inhibition to the particles. The surface modified particles may also improve the effectiveness of the protective organic coating by acting as barriers to slow diffusion of water and other corrosive agents to the metal surface.

The composition of coatings incorporating corrosion inhibitors as described herein on metal surfaces change as the surface and coating are exposed to corrosive conditions. For example, the permeability of the coating may change, and the amount of corrosion inhibitors present in the coating changes with time, as particles release their corrosion inhibitors to the surface. This is expected and desired.

Figure 2:
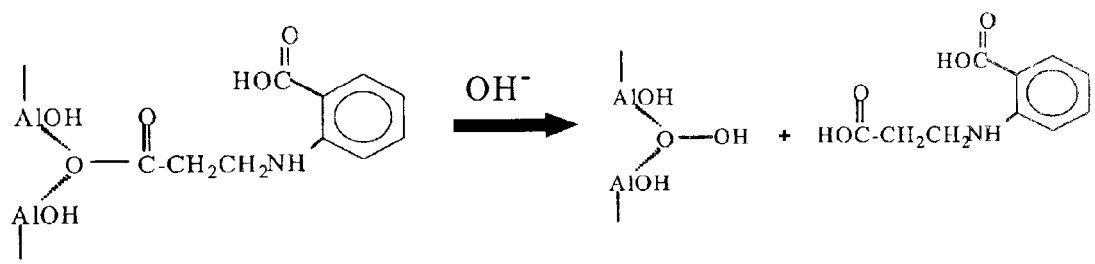
FIG. 2 shows the release of a corrosion inhibitor that has been grafted to an acrylate group that is anchored to the aluminum oxyhydroxide surface.

In one embodiment a corrosion inhibitor can be chemically anchored directly to the aluminum oxyhydroxide surface via a carboxylate group (FIG. 1 and FIG. 2). In this embodiment the corrosion inhibitor contains at least one carboxylic acid group that is used to chemically anchor the corrosion inhibitor to the surface of the particle. The carboxylic acid group may in fact be the primary functional group of the corrosion inhibitor that chemically adsorbs to the metal surface to arrest corrosion or the anchored molecule or carboxylic acid may also contain additional functional groups that inhibit corrosion.

In another embodiment the corrosion inhibitor can be chemically grafted to the aluminum oxyhydroxide surface through reactions that graft the corrosion inhibitor to carboxylates that have previously been chemically anchored to the surface of the aluminum oxyhydroxide surface. The nature of these grafting reactions is elaborated herein. In yet another embodiment the corrosion inhibitors can be chemically grafted to the aluminum oxyhydroxide materials by a series of reactions. The series of reactions may comprise separate sequential reactions with recovery of intermediates, or a series of reactions in a single pot where only the final product is recovered.

The purpose of the described chemical surface anchoring methods is to allow anchoring of different corrosion inhibitors to the surface of the aluminum oxyhydroxide particles or to anchor both corrosion inhibitors and non corrosion inhibitors such as compatibilizing agents to the particle surfaces. The resulting surface modified aluminum oxyhydroxide particles are then incorporated into a protective coating applied to a metal surface. The anchored corrosion inhibitors are released from the aluminum oxyhydroxides by the strongly basic conditions that are encountered following the onset of corrosion of metals such as aluminum and iron.

The corrosion inhibitors of the invention may be used in a variety of applications, including but not limited to polymers coated on a metal surface, paints painted on the metal surface and adhesives coated on a metal surface, powder coatings baked onto metal surfaces, polymers flame sprayed onto metal surfaces, coating materials electrostatically sprayed onto metal surfaces. The corrosion inhibitors can be used with a variety of additives, that may be active or inert, including fillers, anti-oxidants, pigments, colorants, leveling agents, thixotropic agents, UV absorbers, wetting agents, dispersion agents, defoamers biocides, fungicides, etc.

EXAMPLES

The following examples are non-limiting examples of the compositions of corrosion inhibiting particle materials. In the following examples "dried" means spray-dried. Dispersion or redispersion of the dried materials was achieved by string with a Cowles blade or mixing with mini-media in a ball mill. The initial syntheses (e.g. chemically anchoring the carboxylic acid to the particle surface) uses a 15-wt % dispersion of boehmite in water. In the following examples this refers to using 150 grams of boehmite or pseudoboehmite in 1000 grams of water. Both boehmite and pseudoboehmite were used as the aluminum oxyhydroxide materials from which the corrosion inhibiting particles were prepared. The aluminum oxyhydroxides that were used were Catapal A (pseudoboehmite) and Catapal D (boehmite), both produced by Sasol, North America. The use of these materials is illustrative and is not to be construed as limiting.

A typical aqueous preparation of the carboxylate-anchored aluminum oxyhydroxide materials (15 wt % in water) described in the examples is presented below. Aluminum oxyhydroxide (Catapal A or Catapal D, 4550g) was added to 9100 ml of distilled water. The water dispersible carboxylic acid (6:1 aluminum oxyhydroxide to acid or for example 777g for acrylic acid) is then mixed with 2275 ml of distilled water and added slowly (15 to 30 minutes) with stirring to the aluminum oxyhydroxide slurry. Additional distilled water (18300 ml) is then added slowly over 30–60 minutes while stirring. The resulting mixture is then heated to 80° C. overnight before being spray dried. The inlet temperature of the spray-dryer was 170° C. to 190° C. and the outlet temperature was 60° C. to 70° C.

Corrosion testing of the metal panels was carried out according to ASTM B117-97 (Standard Practice for Operating Salt Spray (Fog) Apparatus) and the corrosion results evaluated using D714-87 (Standard Test Method for Evaluating Degree of Blistering of Paints). In the B117-97 test standards the coated test panels were scribed with an X through the paint down to the metal and the test substrates were then placed into the salt fog chamber. The coating substrates were visually inspected and rated from 0 (complete detachment from the substrate) to 10 (no blisters or underfilm corrosion) using the criteria specified in D714-87.

The following are examples of boehmite particles having a single corrosion inhibitor anchored to the surface of the particle by a carboxylate group.

Figure 5:
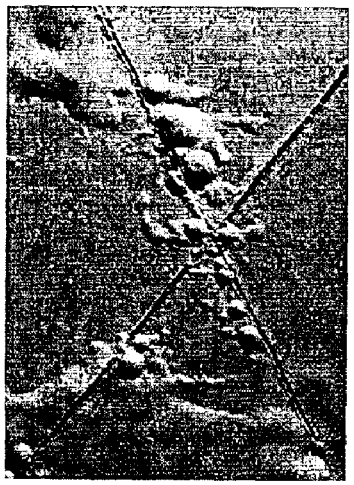
FIG. 5 shows photographs of an unfilled epoxy coated Al-7075 panel after 500 hrs salt testing (left) and an otherwise identical epoxy coating that contains 10-wt % of 4-hydroxybenzoic acid surface modified pseudoboehmite particles after 2000 hrs salt fog testing (right).
Figure 5:
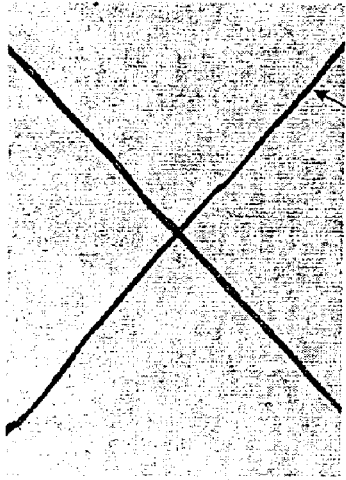

1. Pseudoboehmite (Catapal A, Sasol, NA.) was dispersed in water using p-hydroxybenzoic acid (Al:phydroxybenzoic acid=3:1 molar ratio) and heated to 80° C. overnight. The p-hydroxybenzoic acid corrosion inhibitor was anchored to the pseudoboehmite particle through the carboxylate group. The resulting material was dried and then redispersed in a waterborne epoxy resin at a 10-wt % (dry solids) loading. The waterborne epoxy resin (EPI-REZ 5522-WY-55) and the water reducible curative (EPI-CURE 8290-Y-60) (both made by Resolution Performance Products) were mixed in amounts and under conditions suggested by the technical documents for these two materials. The corrosion inhibiting particles were added to the epoxy side. The epoxy resin was applied to a bare, solvent wiped Al-7075 alloy panel and cured for two weeks at room temperature. The coating was then scribed and tested according to ASTM-B117. After 2000 hours the panels were evaluated by the criteria set forth in ASTM method D714-87. The panels were rated 10 out of 10 according to the ASTM method D714-87, indicating that essentially no corrosion had occurred during the 2000-hour test period. In contrast, an Al-7075 panel coated with the same epoxy but without the corrosion-inhibiting additive had extensive corrosion after only 500 hours and was rated a 4 after 500 hours using the D714-87 standard. FIG. 5 shows a comparison of the two panels.

Figure 6:
FIG. 6 shows photographs of polyurethane coated Al-7075 panels exposed to Salt Fog tests: (a) an unfilled polyurethane coating after 600 hours, (b) and a polyurethane that contains 30-wt % of a 4-hydroxybenzoic acid modified pseudoboehmite additive after 2000 hrs.
Figure 6:
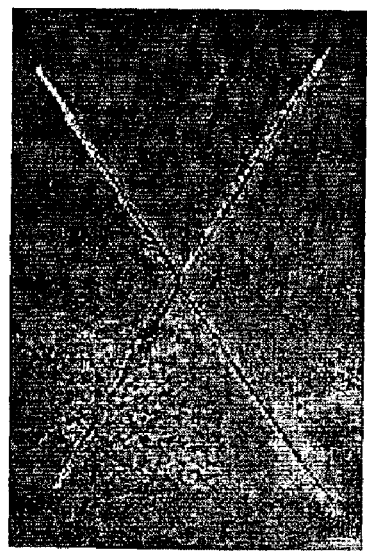

2. Pseudoboehmite (Catapal A, Sasol, N.A.) was dispersed in water using p-hydroxybenzoic acid (Al:p-hydroxybenzoic acid=3:1 molar ratio) and heated to 80° C. overnight. The p-hydroxybenzoic acid corrosion inhibitor was anchored to the pseudoboehmite particle through the carboxylate group. The resulting material was dried and then redispersed in a clear two component polyurethane resin (e.g. Proreco 508 (PRA600+ PRA560)) at a 30-wt % (dry solids) loading and applied to a bare, solvent wiped Al-7075 alloy panel and cured for two weeks at room temperature. The coating was then scribed and tested according to ASTM-B 117. After 2000 hours the panels were evaluated by the criteria set forth in ASTM method D714-87. The panels were rated 10 out of 10 according to the ASTM method D714-87, indicating that essentially no corrosion had occurred during the 2000-hour test period. In contrast, an Al-7075 panel coated with the same polyurethane but without the corrosion-inhibiting additive had extensive corrosion after only 600 hours and was rated a 4 using the D714-87 standard. FIG. 6 shows a comparison of the two panels.

3. Boehmite (Catapal D, Sasol, N.A.) was dispersed in water using 4,4-bis(4-hydroxyphenyl)valeric acid (DPA) (Al:DPA=3:1 molar ratio) and heated to 80° C. overnight The 4,4-bis(4-hydroxyphenyl)valeric acid corrosion inhibitor was anchored to the boehmite particle through the carboxylate group. The resulting material was dried and then redispersed in an epoxy resin at a 10-wt % (dry solids) loading. The waterborne epoxy resin (EPI-REZ 5522-WY-55) and the water reducible curative (EPI-CURE 8290-Y-60) were mixed in amounts and under conditions suggested by the technical documents for these two materials. The corrosion inhibiting additives were added to the epoxy side. The resulting mixture was then applied to a bare, solvent wiped Al-7075 alloy panel and cured for two weeks at room temperature. The coating was then scribed and tested according to ASTM-B117. After 2000 hours the panels were evaluated by the criteria set forth in ASTM method D714-87. The panels were rated 10 out of 10 according to the ASTM method D714-87, indicating that essentially no corrosion had occurred during the 2000-hour test period. In contrast, an Al-7075 panel coated with the same epoxy but without the corrosion-inhibiting additive had extensive corrosion after only 500 hours and was rated a 4 using the D714-87 standard.

4. Pseudoboehmite (Catapal A, Sasol, N.A.) was dispersed in water using 4,4bis(4-hydroxyphenyl)valeric acid (Al: 4,4bis(4-hydroxyphenyl)valeric acid =3:1 molar ratio) and heated to 80° C overnight. The 4,4-bis(4-hydroxyphenyl)valeric acid corrosion inhibitor was anchored to the pseudoboehmite particle through the carboxylate group. The resulting material was dried and then redispersed in a clear two component polyurethane resin (e.g. Proreco 508 (PRA600+PRA560)) at a 30-wt % (dry solids) loading and applied to a bare, solvent wiped Al-7075 alloy panel and cured for two weeks at room temperature. The coating was then scribed and tested according to ASTM-B117. After 2000 hours, the panels were evaluated by the criteria set forth in ASTM method D714-87. The panels were rated 10 out of 10 according to the ASTM method D714-87, indicating that essentially no corrosion had occurred during the 2000-hour test period. In contrast, an Al-7075 panel coated with the same polyurethane but without the corrosion-inhibiting additive had extensive corrosion after only 600 hours and was rated a 4 using the D714-87 standard.

Other non-limiting corrosion-inhibiting compositions containing mixed carboxylic acids include but are not limited to the following. Some of the anchored carboxylic acids (e.g. propionic acid) are added to improve compatibility with the coating and may or may not themselves be effective corrosion inhibitors. As known in the art, various substances are useful to improve compatibility with coatings, and these substances may be incorporated into the materials of the invention without undue experimentation.

5. Pseudoboehmite (Catapal A, Sasol, N.A.) was dispersed in water using propionic acid and p-hydroxybenzoic acid (Al:propionic-acid=12:1, Al: p-hydroxybenzoic acid=12:1 molar ratio) and heated to 80° C. overnight. The mixed propionic acid/p-hydroxybenzoic acid corrosion inhibitors are anchored to the pseudoboehmite particle through the carboxylate group. The propionic acid assists in the dispersion of the boehmite particle and provides a limited amount of corrosion protection, while the p-hydroxybenzoic acid provides the bulk of the corrosion protection. The mixed acid material was dried and then redispersed in an epoxy resin formulation (Epon Resin 828) at a 10-wt % (dry solids) loading. The resulting mixture was then mixed with an amine curative (Ancamide 2445) and applied to a bare, solvent wiped Al-7075 alloy panel and cured for two weeks at room temperature. The coating was then scribed and tested according to ASTM-B 117. After 2000 hours the panels were evaluated by the criteria set forth in ASTM method D714-87. The panels were rated 10 out of 10 according to the ASTM method D714-87.

6. Boehmite (Catapal D, Sasol, N.A.) was dispersed in water using a mixture of propionic acid and 4,4-Bis(4-hydroxyphenyl)valeric acid (Al:propionic-acid =12:1, Al: 4,4-Bis(4-hydroxyphenyl)valeric acid =12:1 molar ratio) and heated to 80° C. overnight The mixed propionic acid/4,4-bis(4-hydroxyphenyl)valeric acid corrosion inhibitors are anchored to the boehmite particle through the carboxylate group. The propionic acid assists in the dispersion of the boehmite particle and provides a limited amount of corrosion protection, while the 4,4-Bis(4-hydroxyphenyl)valeric acid provides the bulk of the corrosion protection. The mixed acid material was dried and then redispersed in an epoxy resin formulation (Epon Resin 828) at a 10-wt % (dry solids) loading. The resulting mixture was then mixed with an amine curative (Ancamide®2445) and applied to a bare, solvent wiped Al-7075 alloy panel and cured for two weeks at room temperature. The coating was then scribed and tested according to ASTM-B117. After 2000 hours the panels were evaluated by the criteria set forth in ASTM method D714-87. The panels were rated 10 out of 10 according to the ASTM method D714-87.

7. Pseudoboehmite (Catapal A, Sasol, N.A.) was dispersed in water using a mixture of sorbic acid (previously dispersed in alcohol) and p-hydroxybenzoic acid (Al: sorbic acid=12:1, Al: p-hydroxybenzoic acid=12:1 molar ratio) and heated to 80° C. overnight. The mixed sorbic acid/phydroxybenzoic acid corrosion inhibitors were anchored to the pseudoboehmite particle through the carboxylate group. The resulting material was dried and can used as a corrosion inhibitor in epoxy or polyurethane coatings.

8. Pseudoboehmite (Catapal A, Sasol, N.A.) was dispersed in water using a mixture of oleic acid (previously dispersed in alcohol) and p-hydroxybenzoic acid (Al: oleic acid=12:1, Al: p-hydroxybenzoic acid=12:1 molar ratio) and heated to 80° C. overnight. The mixed oleic acid/p-hydroxybenzoic acid corrosion inhibitors were anchored to the pseudoboehmite particle through the carboxylate group. The resulting material was dried and can be used as a corrosion inhibitor in epoxy or polyurethane coatings.

9. Pseudoboehmite (Catapal A, Sasol, N.A.) was dispersed in water using a mixture of oleic acid and p-nitrobenzoic acid (Al:propionic-acid=12:1, Al: p-nitrobenzoic acid=12:1 molar ratio) and heated to 80° C. overnight. The mixed oleic acid/p-nitrobenzoic acid corrosion inhibitors were anchored to the pseudoboehmite particle through the carboxylate group. One role of the p-nitrobenzoic acid material is to enhance the formation and stability of the protective metal oxide film at the metal/coating interface. The resulting material was dried and can used as a corrosion inhibitor in epoxy or polyurethane coatings.

10. Pseudoboehmite (Catapal A, Sasol, N.A.) was dispersed in water using a mixture of oleic acid and histidine (Al: oleic acid=12:1, Al: histidine =12:1 molar ratio) and heated to 80° C. overnight. The mixed oleic acid/histidine corrosion inhibitors are chemically anchored to the pseudoboehmite particle through the carboxylate group. The resulting material was dried and can used as a corrosion inhibitor in epoxy or polyurethane coatings.

Other non-limiting corrosion-inhibiting compositions containing mixed grafted corrosion inhibiting compositions include but are not limited to the following examples. Some surface modifications (e.g. the anchored acrylate subsequently Michael adducted with Huntsman XTJ-507) are added to improve compatibility with the coating and may or may not be effective corrosion inhibitors. These modifications to improve compatibility are known in the art and are useful in the invention without undue experimentation.

11. Pseudoboehmite (Catapal A, Sasol, N.A.) was dispersed in water using acrylic acid (Al:acrylic-acid=6:1 molar ratio) and heated to 80° C. overnight. The resulting acrylate surface modified pseudoboehmite materials were then spray-dried. The resulting material was redispersed in water and anthranilic acid was Michael adducted to the surface anchored acrylate. The grafted corrosion inhibitors are chemically anchored to the boehmite particle through formation of a chemical bond with the acrylate group on the acrylic acid, which in turn is anchored to the aluminum oxyhydroxide surface through its carboxylate group. The resulting material was dried and can used as a corrosion inhibitor in protective organic coatings.

12. Pseudoboehmite (Catapal A, Sasol, N.A.) was dispersed in water using acrylic acid (Al:acrylic-acid=6:1 molar ratio) and heated to 80° C. overnight. The resulting acrylate surface modified pseudoboehmite materials were then spray-dried. The resulting material was redispersed in water and both anthranilic acid and steryl amine (each 12:1 with respect to the Al) were Michael adducted to the surface anchored acrylates. These compounds were grafted to the surface-anchored acrylate by heating the acrylate-modified aluminum oxyhydroxides and the amines in water to 80° C. A small amount of catalyst ($Et_3N$, 0.1 wt %) was added to the mixture before heating. The grafted corrosion inhibitors are chemically anchored to the boehmite particle through formation of a chemical bond with the acrylate group on the acrylic acid, which in turn is anchored to the aluminum oxyhydroxide surface through its carboxylate group. The resulting material was dried and can used as a corrosion inhibitor in protective organic coatings.

13. Boehmite (Catapal D, Sasol, N.A.) was dispersed in water using a mixture of acrylic acid and oleic acid (Al:acrylic-acid=12:1, molar ratio, Al:oleic acid=12:1, molar ratio) and heated to 80° C. overnight. The resulting acrylate and oleic acid surface modified boehmite materials were then spray-dried. The resulting material was then redispersed in water and both anthranilic acid and steryl amine (24:1 with respect to the Al) were Michael adducted to the surface anchored acrylate. These compounds were grafted to the surface-anchored acrylate by heating the acrylate-modified aluminum oxyhydroxides and the amines in water to 80° C. A small amount of catalyst ($Et_3N$, 0.1 wt %) was added to the mixture before heating. The grafted corrosion inhibitors are chemically anchored to the boehmite particle through formation of a chemical bond with the acrylate group on the acrylic acid, which in turn is anchored to the aluminum oxyhydroxide surface through its carboxylate group. The resulting material was dried and can used as a corrosion inhibitor in protective organic coatings.

14. Pseudoboehmite (Catapal A, Sasol, N.A.) was dispersed in water using a mixture of acrylic acid and p-nitrobenzoic acid (Al:acrylic-acid=12:1, molar ratio, Al:p-nitrobenzoic acid=12:1, molar ratio) and heated to 80° C. overnight. The resulting acrylate and oleic acid surface modified pseudoboehmite materials were then spray-dried. The resulting material was redispersed in water and anthranilic acid (12:1 with respect to the Al) was Michael adducted to the surface anchored acrylate. These compounds were grafted to the surface-anchored acrylate by heating the acrylate-modified aluminum oxyhydroxides and the amines in water to 80° C. A small amount of catalyst ($Et_3N$, 0.1 wt %) was added to the mixture before heating. The grafted corrosion inhibitors are chemically anchored to the boehmite particle through formation of a chemical bond with the acrylate group on the acrylic acid, which in turn is anchored to the aluminum oxyhydroxide surface through its carboxylate group. The resulting material was dried and can used as a corrosion inhibitor in protective organic coatings.

15. Pseudoboehmite (Catapal A, Sasol, N.A.) was dispersed in water using acrylic acid (Al:acrylic-acid= 12:1 molar ratio) and heated to 80° C. overnight. The acrylic acid modified pseudoboehmite materials were then spray-dried The resulting material was redispersed in water and Huntsman XTJ-507 was Michael adducted to the acrylic acid (24:1 with respect to the Al). Glysine-N,N-(dimethylene phosphonic acid) Al:acid= 12:1 molar ratio) was then chemically anchored to the surface of the pseudoboehmite particles. The role of the Huntsman XTJ-507 adduct was to provide steric stabilization to the particles and to compatibilize the particles with the polymer resin. The resulting material was dried and can used as a corrosion inhibitor in the protective coatings.

Although applicant does not wish to be bound by theory, the above non-liming examples when added to protective resins such as polyurethanes and epoxies offer improved corrosion resistance by serving as reservoirs of corrosion inhibitors that are released to the corrosion site by reaction of the surface modified particles with hydroxide ions that are generated following the onset of corrosion of the metal.

Although the description above contains many specificities, these are not meant to limit the invention but as merely to provide illustrations of some of the preferred embodiments. For example, the examples are not meant to limit the polymer resins to which the corrosion inhibiting particles can be added, but serve as illustrations of some of the compositions of the corrosion inhibiting particles. In addition, different corrosion inhibitors other than those exemplified may be used. All references cited herein are hereby incorporated by reference to the extent not inconsistent with the disclosure herewith.

I claim:

1. A corrosion inhibiting material comprising:
   a particle having an aluminum oxyhydroxide surface; a carboxylate group chemically anchored to the aluminum oxyhydroxide surface; and one or more corrosion inhibitors chemically anchored to the aluminum oxyhydroxide surface through the carboxylate group.

2. The material of claim 1 wherein the particle having an aluminum oxyhydroxide surface is a boehmite or pseudoboehmite particle.

3. The material of claim 1 wherein the particle having an aluminum oxyhydroxide surface is a particle having an aluminum oxyhydroxide surface and a core of a different substance.

4. The material of claim 1, further comprising one or more non-corrosion inhibiting groups chemically anchored to the particle.

5. The material of claim 1, wherein the corrosion inhibitors that are chemically anchored to the aluminum oxyhydroxide surface through the carboxylate group are selected from the group consisting of: phenols, organic amines, organic sulfides, heterocylic rings, substituted aromatic rings, organic phosphates and phosphonic acids.

6. The material of claim 1, wherein each corrosion inhibitor chemically anchored to the aluminum oxyhydroxide surface has the same chemical formula.

7. The material of claim 1, wherein the material contains at least two corrosion inhibitors with different chemical formulas.

8. The material of claim 1 wherein the corrosion inhibitor contains one or more members of the group consisting of: a monovalent, divalent or trivalent salt of an organic amine, an organic sulfide, a heterocylic ring, a substituted aromatic ring, an organic phosphate and a phosphonic acid.

9. A corrosion inhibiting material comprising:
   a particle having an aluminum oxyhydroxide surface; and one or more members of the group consisting of: a non-corrosion inhibiting group directly chemically anchored to the aluminum oxyhydroxide surface through a carboxylate group; a corrosion inhibiting group directly chemically anchored to the aluminum oxyhydroxide surface through a carboxylate group; a non-corrosion inhibiting group indirectly chemically anchored to the aluminum oxyhydroxide surface by grafting the non-corrosion inhibiting group to a surface anchored carboxylate that has a reactive functional group; and a corrosion inhibiting group indirectly chemically anchored to the aluminum oxyhydroxide surface by grafting the corrosion inhibiting group to a surface anchored carboxylate that has a reactive functional group wherein at least one corrosion inhibiting group and at least one non-corrosion inhibiting group are anchored to the aluminum oxyhydroxide surface of the particle.

10. The material of claim 9 wherein the corrosion inhibiting group directly chemically anchored to the aluminum oxyhydroxide surface through a carboxylate group is selected from the group consisting of: an aromatic acid, an aliphatic acid, a cycloaliphatic acid, an alkene containing aliphatic acid, an alkene containing cycloaliphatic acid, an amino acid, a heterocylic aromatic and aliphatic acid.

11. The material of claim 9 wherein the corrosion inhibiting group is selected from the group consisting of: organic amines, organic sulfides, heterocylic rings, substituted aromatic rings, organic phosphates and phosphonic acids.

12. The material of claim 9 wherein the particle is boehmite, pseudoboehmite or has a surface of boehmite or pseudoboehmite.

13. The material of claim 1, made by the method comprising:
    chemically anchoring a functionalized carboxylic acid molecule to a particle having an aluminum oxyhydroxide surface, forming an anchored functionalized carboxylic acid; then grafting one or more corrosion inhibitors to the anchored functionalized carboxylic acids.

14. The material of claim 1, made by the method comprising:
    chemically anchoring two or more different functionalized carboxylic acid molecules to a particle having an aluminum oxyhydroxide surface, forming anchored functionalized carboxylic acids;
    then grafting one or more corrosion inhibitors to the anchored functionalized carboxylic acids.

15. The material of claim 13, wherein the grafting step comprises: reacting a functionalized corrosion inhibitor with the anchored functionalized carboxylic acid.

16. The material of claim 13, wherein the grafting step comprises: reacting the anchored functionalized carboxylic acid with one or more intermediate reactive compounds, forming an intermediate particle and reacting the intermediate particle with one or more corrosion inhibitors.

17. The material of claim 14, wherein the grafting step comprises: reacting a functionalized corrosion inhibitor with the anchored functionalized carboxylic acid.

18. The material of claim 14, wherein the grafting step comprises: reacting the anchored functionalized carboxylic acid with one or more intermediate reactive compounds, forming an intermediate particle and reacting the intermediate particle with one or more corrosion inhibitors.

19. An organic polymer protective coating comprising:
    a polymer; and at least one type of corrosion inhibiting material comprising:
    a particle having an aluminum oxyhydroxide surface; a carboxylate group chemically anchored to the aluminum oxyhydroxide surface; and one or more corrosion inhibitors chemically anchored to the aluminum oxyhydroxide surface through the carboxylate group, forming a corrosion-inhibiting particle.

20. The coating of claim 19, wherein each corrosion-inhibiting particle has one corrosion inhibitor functionality, and the polymer includes more than one different corrosion-inhibiting particle.

21. The coating of claim 19, wherein at least one corrosion-inhibiting particle contains more than one different corrosion inhibitor chemical functionality.

22. A method for inhibiting corrosion of a metal or alloy surface comprising: applying an organic polymer protective coating of claim 19 to the metal or alloy surface.

23. The method of claim 22 further comprising:
    mixing the organic polymer protective coating with an adhesive composition prior to applying the adhesive mixture to the metal or alloy surface.

24. The material of claim 1 wherein the carboxylate is chemically anchored to the aluminum oxyhydroxide surface such that under corrosion-causing conditions the chemical bond between the carboxylate and the aluminum-oxyhydroxide surface breaks thereby releasing one or more corrosion inhibitors from the particle surface.

25. The material of claim 24 wherein the corrosion-causing conditions are basic conditions.

26. The material of claim 24 wherein the one or more corrosion inhibitors are selected from the group consisting of imidazoles, azoles, and oximes.

27. The material of claim 24 wherein the one or more corrosion inhibitors are organic sulfides.

28. The material of claim 24 wherein the one or more corrosion inhibitors are phosphonic acids.

29. The material of claim 1 wherein the ratio of surface Al atoms on the aluminum oxyhydroxide surface to the corrosion inhibitors ranges from 2:1 to 100:1.

30. The material of claim 1 wherein there are between 0.5 and 0.05 corrosion inhibitors per number of surface Al on the aluminum oxyhydroxide surface.

31. The organic polymer protective coating of claim 19 wherein the one or more corrosion inhibitors are selected from the group consisting of: organic amines, organic sulfides, heterocylic rings, substituted aromatic rings, organic phosphates and phosphonic acids.

32. The organic polymer protective coating of claim 19 wherein the one or more corrosion inhibitors are selected from the groups consisting of quaternary ammonium compounds, imidazolines, aldehydes, sulfoxides, carboxylic acids, mercaptocarboxylic acids, imidazoles, oximes, azoles, tannins, substituted phenols, substituted quinolines and quinalizarin.

33. The organic polymer protective coating of claim 19 wherein the one or more corrosion inhibitors are selected from the group consisting of imidazoles, azoles, oximes, organic sulfides, and phosphonic acids.

34. The organic polymer protective coating of claim 19 wherein the one or more corrosion inhibitors are chelating agents.

35. The organic polymer protective coating of claim 19 wherein the polymer is selected from the group consisting of latexes, amino resins, polyurethanes, epoxies, phenolic resins, acrylic resins, polyester resins, alkyd resins, polysulfide resins and halogenated polymer resins.

36. The organic polymer protective coating of claim 19 wherein the polymer is a polyurethane or an epoxy.

37. The method of claim 22 wherein the metal or alloy surface is iron, aluminum, copper, magnesium, nickel, brass or bronze.

38. The method of claim 22 wherein the metal or alloy surface is iron or aluminum.

39. The method of claim 22 wherein the organic protective coating is applied to the metal or alloy surface by painting, baking powder coatings, flame spraying or electrostatic spraying.

40. The method of claim 22 wherein each corrosion-inhibiting particle of the organic polymer coating has one corrosion inhibitor functionality, and the polymer includes more than one different corrosion-inhibiting particle.

41. The method of claim 22 wherein at least one corrosion-inhibiting particle of the organic polymer coating contains more than one different corrosion inhibitor chemical functionality.

42. The method of claim 22 wherein the corrosion is under-coat corrosion, or corrosion that occurs when the protective coating is damaged or defective.

43. The method of claim 22 wherein in at least one corrosion inhibiting material in the organic polymer coating, a corrosion inhibitor is chemically anchored to the aluminum oxyhydroxide particle surface such that under corrosion-causing conditions the corrosion inhibitor is released from the particle surface.

44. The method of claim 43 wherein the corrosion inhibitor that is released can be transported to the site of corrosion to inhibit the corrosion reaction.

* * * * *